(12) United States Patent
Kuriyama (10) Patent No.: US 11,878,556 B2
(45) Date of Patent: Jan. 23, 2024

(54) PNEUMATIC TIRE

(71) Applicant: Toyo Tire Corporation, Itami (JP)

(72) Inventor: Hikaru Kuriyama, Itami (JP)

(73) Assignee: TOYO TIRE CORPORATION, Itami (JP)

(*) Notice: Subject to any disclaimer, the term of this patent is extended or adjusted under 35 U.S.C. 154(b) by 0 days.

(21) Appl. No.: 18/092,632

(22) Filed: Jan. 3, 2023

(65) Prior Publication Data

US 2023/0241929 A1   Aug. 3, 2023

(30) Foreign Application Priority Data

Feb. 3, 2022 (JP) ................................. 2022-015752

(51) Int. Cl.
*B60C 13/00* (2006.01)
(52) U.S. Cl.
CPC .................................. *B60C 13/001* (2013.01)
(58) Field of Classification Search
CPC ..... B60C 13/00; B60C 13/001; B60C 13/002; B60C 13/003; B60C 13/02; B60C 13/023
See application file for complete search history.

(56) References Cited

U.S. PATENT DOCUMENTS

| D200,689 | S | * | 3/1965 | Calvin | ........................ D12/605 |
| D208,751 | S | * | 9/1967 | Aristides | ...................... D12/605 |
| 2006/0032569 | A1 | * | 2/2006 | Zimmer | ................ G03F 7/0037 |
| | | | | | 156/116 |
| 2008/0283169 | A1 | | 11/2008 | Sato et al. | |
| 2009/0194211 | A1 | * | 8/2009 | Howald | .............. B60C 11/0316 |
| | | | | | 152/209.1 |
| 2019/0263193 | A1 | * | 8/2019 | Nakajima | ............. B60C 13/001 |
| 2020/0171887 | A1 | * | 6/2020 | Hayashi | .................. B60C 13/02 |

FOREIGN PATENT DOCUMENTS

JP          2008-273505 A        11/2008

* cited by examiner

*Primary Examiner* — Cedrick S Williams
*Assistant Examiner* — Thomas Frank Schneider
(74) *Attorney, Agent, or Firm* — WHDA, LLP (57) ABSTRACT

A pneumatic tire includes a sidewall surface 10 having a profile surface formed in a curved surface shape and a decorative area 11 provided on the sidewall surface 10, in which a plurality of planes 19, 20 with a rhombus shape and a plurality of planes 21, 22 with a shape of part of a rhombus are tightly arranged in the decorative area 11 so that sides and vertices of the rhombuses correspond to one another, two planes 20, 21 and two planes 19, 22 in which perpendicular line directions are different are aligned in a tire radial direction, and vertices to be contact points between the two planes 20, 21 and between the two planes 19, 22 aligning in the tire radial direction are protruding vertices 23, 24 protruding in a normal line direction of the profile surface.

7 Claims, 11 Drawing Sheets

PNEUMATIC TIRE

CROSS-REFERENCE TO RELATED APPLICATIONS

This application claims the benefit of and priority to Japanese Patent Application 2022-015752 filed on Feb. 3, 2022, and the content thereof is incorporated herein by reference in its entirety.

BACKGROUND OF THE INVENTION

1. Field of the Invention

The present invention relates to a pneumatic tire.

2. Description of the Related Art

There has been known a pneumatic tire provided with a pattern formed of irregularities on a sidewall surface. Most of patterns formed of irregularities are made by arranging many ridges extending in straight lines at equal intervals. Moreover, a pattern in which many portions with the same three-dimensional shape are arranged has been also known. For example, a pattern disclosed in JP-A-2008-273505 is made by arranging many portions with a square pyramid shape respectively as recesses with respect to a reference surface.

SUMMARY OF THE INVENTION

Incidentally, beautiful patterns have been frequently proposed; however, an innovative pattern to create new-type visual effects has not been frequently proposed.

In view of the above, an object of the invention is to provide a pneumatic tire in which new visual effects can be created.

According to an aspect of the invention, there is provided a pneumatic tire that includes a sidewall surface having a profile surface formed in a curved surface shape and a decorative area provided on the sidewall surface, in which a plurality of planes with a rhombus shape and a plurality of planes with a shape of part of a rhombus are tightly arranged in the decorative area, perpendicular line directions of the planes aligning in a tire radial direction differ, and vertices of the rhombuses to be ends in the tire radial direction of the planes aligning in the tire radial direction are protruding vertices protruding in a normal line direction of the profile surface.

Due to the above features, new visual effects are created by the pneumatic tire according to the embodiment.

DESCRIPTION OF EMBODIMENTS

Figure 1:
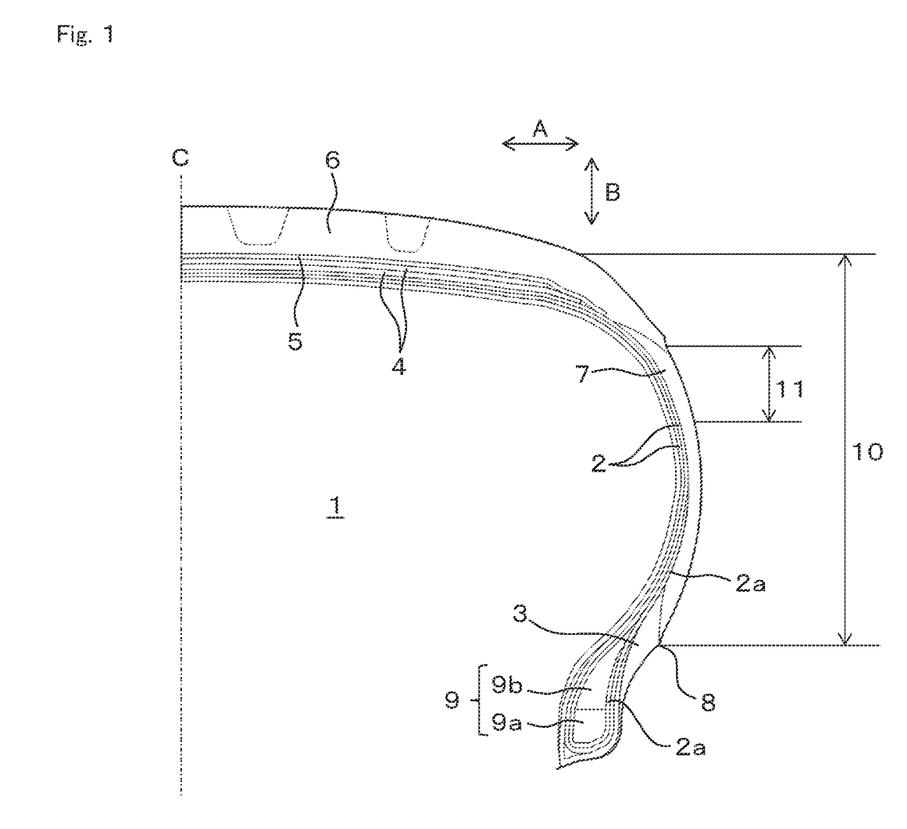
FIG. 1 is a half cross-sectional view of a pneumatic tire in an axial direction.

FIG. 1 shows a cross-sectional structure of a pneumatic tire 1 according to an embodiment. FIG. 1 shows only a half of the structure in a tire axial direction, and the actual pneumatic tire 1 is approximately right-and-left symmetrical with respect to a center line C. The tire axial direction is denoted by an arrow A in FIG. 1, and a tire radial direction is denoted by an arrow B in FIG. 1 and FIG. 2.

The pneumatic tire 1 is provided with bead parts 9 on both sides in the tire axial direction. Each bead part 9 includes a bead core 9a formed of steel wire wound in a circular shape and a rubber bead filler 9b provided on an outer side in a radial direction of the bead core 9a.

One or two carcass plies 2 are hung across the bead parts 9 on both sides in the tire axial direction. The carcass ply 2 is a sheet-shaped member in which many ply cords aligned in a direction orthogonal to a tire circumferential direction are coated with rubber. The carcass plies 2 form a frame shape of the pneumatic tire 1 between the bead parts 9 on both sides in the tire axial direction and wrap the bead parts 9 by being turned up from the inside to the outside in the tire axial direction and wound up around the bead parts 9. Moreover, a rubber chafer 3 is provided at a place on an outer side in the tire axial direction of a turned-up portion 2a in the carcass plies 2.

A plurality of belts 4 is provided on an outer side in the tire radial direction of the carcass plies 2, and a belt reinforcing layer 5 is provided on an outer side in the tire radial direction of the belts 4. The belt 4 is a member formed of many steel cords coated with rubber. The belt reinforcing layer 5 is a member formed of many organic fiber cords coated with rubber. A tread rubber 6 is provided on an outer side in the tire radial direction of the belt reinforcing layer 5. Many grooves are formed on the tread rubber 6 to form a tread pattern.

Sidewall rubbers 7 are provided on both sides in the tire axial direction of the carcass plies 2. The tread rubber 6 and the sidewall rubber 7 overlap each other on a buttress; however, any of the tread rubber 6 and the sidewall rubber 7 may overlap on a tire surface side. A portion of the sidewall rubber 7 on an inner side in the tire radial direction extends close to the bead part 9 and covers part of the rubber chafer 3.

A rim line 8 that is a small protrusion with a height of approximately 1 mm is formed at a boundary between the sidewall rubber 7 and the rubber chafer 3 on the tire surface. The rim line 8 extends around the tire in the tire circumferential direction. It is also preferable that a rim protector protruding to make an approximately triangular shape in cross section is provided at the same place as the rim line 8 instead of the rim line 8. A range from the rim line 8 or the rim protector to a tread end in the tire radial direction is defined as a sidewall surface 10.

Here, the tread end means an end in the tire axial direction of a contact surface between the tread rubber 6 and a road surface when the tire is fitted to a normal rim in a state where a normal internal pressure is filled and a normal load is applied. Here, the normal rim is a rim specified by a standard for each tire in a standard system including the standard with which the tire complies, which includes, for example, a standard rim in JATMA and "measuring Rim" in TRA and ETRTO. Moreover, the normal internal pressure is an air pressure specified by each standard for each tire in the standard system including a standard with which the tire complies, which includes the maximum air pressure in JATMA, the maximum value described in the table "TIRE LOAD LIMITS AT VARIOUS COLD INFLATION PRESSURES" in TRA, and "INFLATION PRESSURE" in ETRTO in the case of tires for trucks and busses or tires for light trucks. The normal internal pressure is normally 180 kPa in the case of tires for passenger cars, but is set to 220 kPa in the case of tires on which "Extra Load" or "Reinforced" is written. Furthermore, the normal load is a load specified by each standard for each tire in the standard system including a standard with which the tire complies, which includes "the maximum load ability" in JATMA, the maximum value described in the table "TIRE LOAD LIMITS AT VARIOUS COLD INFLATION PRESSURES" in TRA, and "LOAD CAPACITY" in ETRTO. The normal load is a load corresponding to 88% of above respective loads in the case of tires for passenger cars. The normal load is 392 N when the tire is for a racing kart.

A sheet-shaped inner liner made of rubber with low air permeability is bonded to the inside of the carcass ply 2. In addition to these members, members such as a belt-under pad and a chafer are provided according to functional need of the tire.

Figure 2:
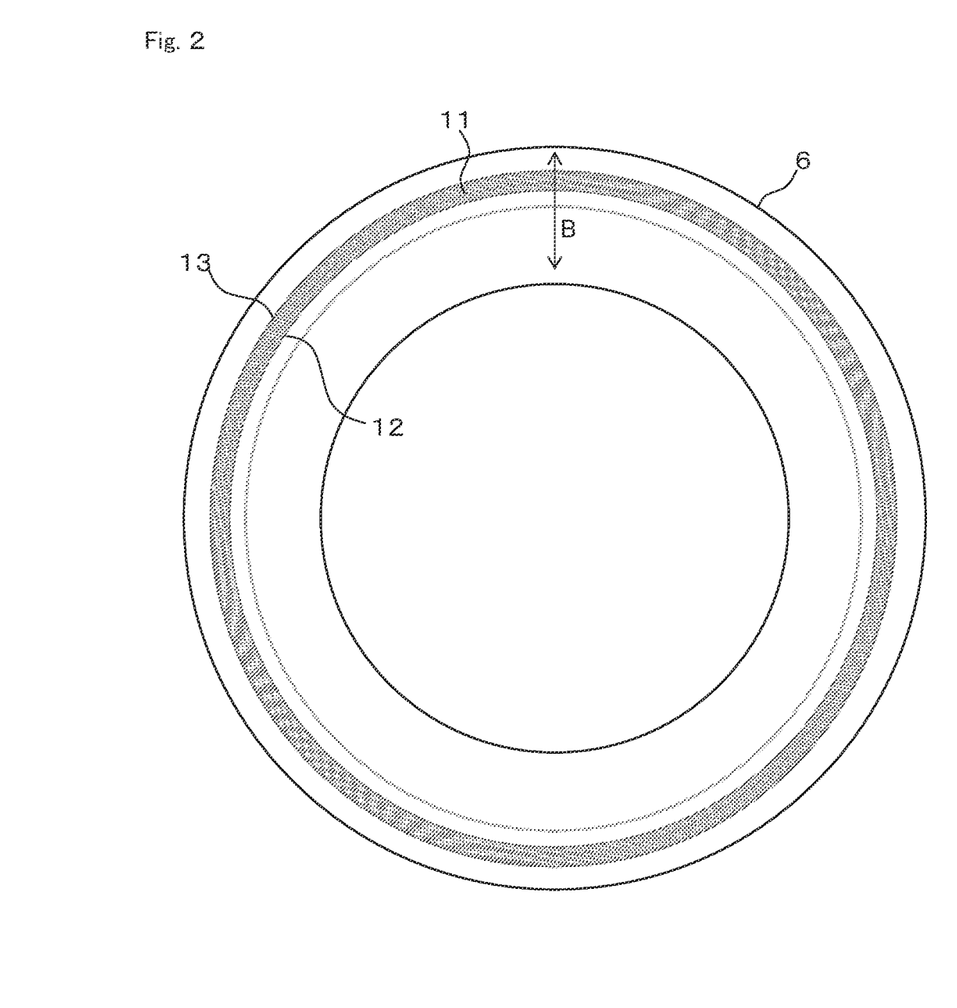
FIG. 2 is a view of a sidewall surface when seen from a tire axial direction.

As shown in FIG. 1 and FIG. 2, a decorative area 11 is provided on at least one of the sidewall surfaces 10 on both sides in the tire axial direction. The decorative area 11 has a ring shape centered at a tire rotation axis. The decorative area 11 is a band-shaped area with a fixed width, which is surrounded by an inner diameter-side line 12 having a circular shape with a small diameter and an outer diameter-side line 13 having a circular shape with a large diameter. The inner diameter-side line 12 and the outer diameter-side line 13 may be lines formed by recesses/protrusions or steps on the tire surface, or may be virtual lines not actually exist.

The decorative area 11 occupies part of a range from a position of the maximum width of the pneumatic tire 1 to the tread end. Here, the position of the maximum width of the pneumatic tire 1 is a position where a length in the tire axial direction from the surface of one sidewall surface 10 in the axial direction to the surface of the other sidewall surface 10 in the tire axial direction is the longest when the tire is fitted to the normal rim in the state where the normal internal pressure is filled and the normal load is applied. A width of the decorative area 11 (a length in the tire radial direction) is, for example, 5 mm or more to 50 mm or less.

The decorative area 11 may also be provided so as to include a place where a step tends to appear on the surface of the sidewall surface 10. The place where the step tends to appear on the surface of the sidewall surface 10 typically includes places at ends of tire constituting members. As such typical places, for example, there are a place where an interface between the tread rubber 6 and the sidewall rubber 7 appears on the tire surface, a place of a wound-up end of the carcass plies 2 (an end of the turned-up portion 2a of the carcass plies 2) in the tire axial direction, and the like.

Figure 3:
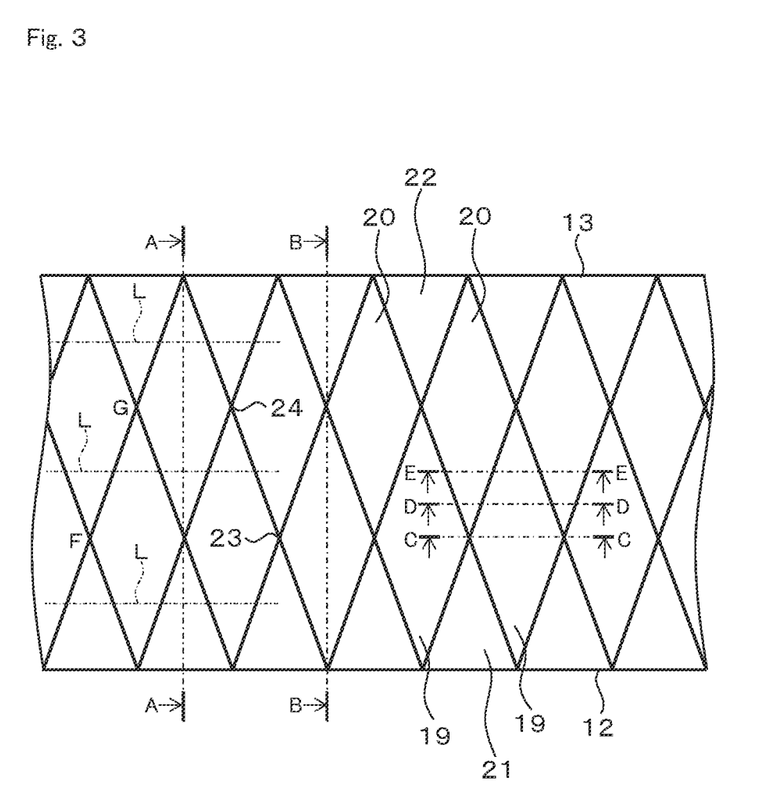
FIG. 3 is an enlarged view of a decorative area on the sidewall surface.
Figure 4:
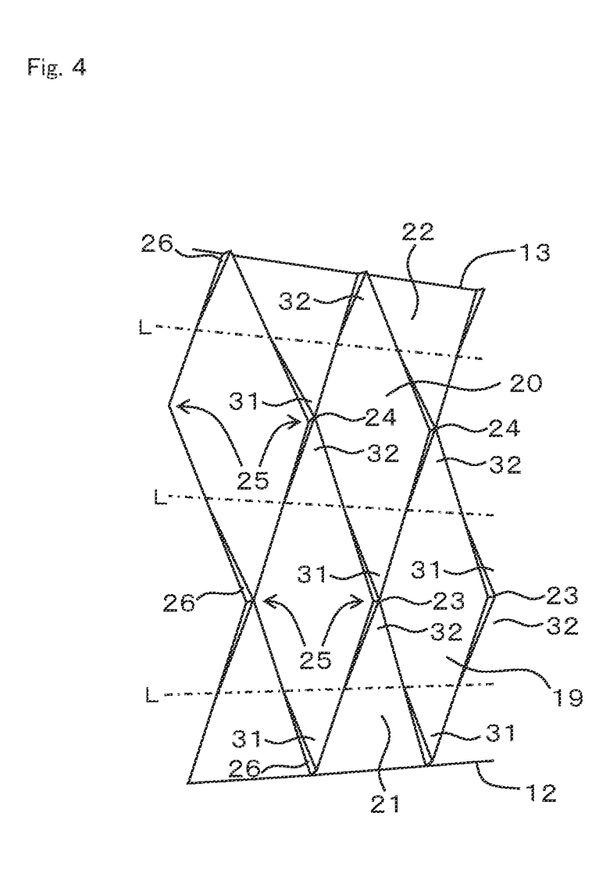
FIG. 4 is a perspective view of the decorative area.

As shown in FIG. 3 and FIG. 4, many planes 19, 20 with a rhombus shape (hereinafter referred to as "rhombus planes 19, 20) are provided in the above decorative area 11. Many rhombus planes 19, 20 are tightly arranged so that sides and vertices of rhombuses correspond to one another. Then, two rows of rhombus planes 19, 20 that extend around the tire in the tire circumferential direction are formed. In each of the rows of the rhombus planes 19, 20, rhombus planes 19, 20 are aligned side by side in the tire circumferential direction while contacting one another. As the rows of the rhombus planes 19, 20, a first row on an inner side in the tire radial direction and a second row on an outer side in the tire radial direction are formed. In FIG. 3 and FIG. 4, rhombus planes in the first row are denoted by a symbol 19 and rhombus planes in the second row are denoted by a symbol 20.

The rhombus planes 19 in the first row and the rhombus planes 20 in the second row are shifted from each other in the tire circumferential direction by half the length of each of the rhombus planes 19, 20 in the tire circumferential direction. Then, a rhombus plane 20 in the second row enters between two rhombus planes 19 in the first row, and a rhombus plane 19 in the first row enters between two rhombus planes 20 in the second row. Accordingly, the rhombus planes 19 in the first row and the rhombus planes 20 in the second row are alternately aligned in the tire circumferential direction. There is no gap between the rhombus planes 19 in the first row and the rhombus planes 20 in the second row. Long diagonals of rhombuses in the rhombus planes 19, 20 extend in the tire radial direction.

Inner ends in the tire radial direction of the rhombus planes 19 in the first row correspond to the inner diameter-side line 12 of the decorative area 11. A plane 21 with a triangular shape (hereinafter referred to as a "triangular plane 21") is formed between two rhombus planes 19 in the first row and the inner diameter-side line 12. The triangular planes 21 make a row extending around the tire in the tire circumferential direction along the inner diameter-side line 12. Moreover, the rhombus planes 19 in the first row and the triangular planes 21 are alternately aligned in the tire circumferential direction near the inner diameter-side line 12. There is no gap between the rhombus planes 19 in the first row and the triangular planes 21.

Outer ends in the tire radial direction of the rhombus planes 20 in the second row correspond to the outer diameter-side line 13 of the decorative area 11. A plane 22 with a triangular shape (hereinafter referred to as a "triangular plane 22") is formed between two rhombus planes 20 in the second row and the outer diameter-side line 13. The triangular planes 22 make a row extending around the tire in the tire circumferential direction along the outer diameter-side line 13. Moreover, the rhombus planes 20 in the second row and the triangular planes 22 are alternately aligned in the tire circumferential direction near the outer diameter-side line 13. There is no gap between the rhombus planes 20 in the second row and the triangular planes 22.

Each of the triangular planes 21, 22 corresponds to the half of each of the rhombus planes 19, 20. The triangular plane 21 contacting the inner diameter-side line 12 corresponds to the half of each of the rhombus planes 19, 20 on the outer side in the tire radial direction. The triangular plane 22 contacting the outer diameter-side line 13 corresponds to the half of each of the rhombus planes 19, 20 on the inner side in the tire radial direction. Accordingly, it can be said that the triangular planes 21, 22 are parts of the rhombus planes 19, 20.

The above rhombus planes 19, 20 and the triangular planes 21, 22 are tightly arranged in the entire decorative area 11 without gaps. Therefore, it can be said that the entire decorative area 11 is formed of many small planes 19, 20, 21, and 22.

The rhombus planes 19, 20 and the triangular planes 21, 22 are provided so as to contact a profile surface formed in a curved surface shape. The profile surface on the sidewall surface 10 is a tire surface without irregularities such as decoration. The profile surface is one curved surface smoothly connecting areas without irregularities on both sides in the tire radial direction of the decorative area 11. The profile surface is shown by a two-dot chain line in FIG. 5 and FIG. 6.

Figure 5:
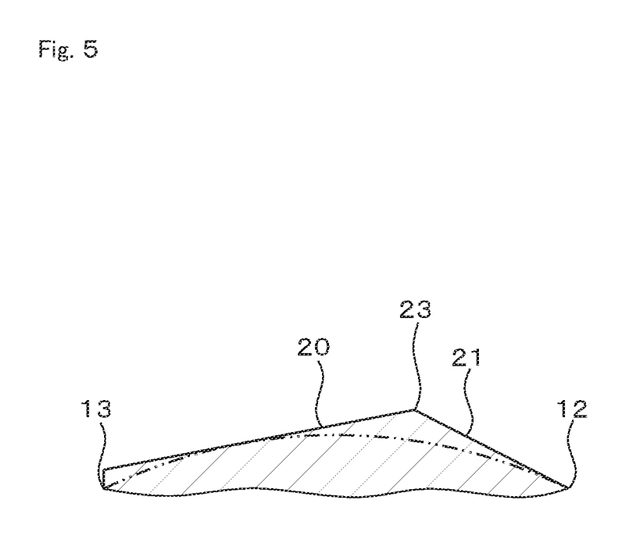
FIG. 5 is A-A cross-sectional view of FIG. 3.

As shown in FIG. 5, the rhombus plane 20 and the triangular plane 21 direct different directions (in other words, perpendicular line directions with respect to respective surfaces are different). Then, a contact point between the rhombus plane 20 and the triangular plane 21 protrudes high in a normal line direction of the profile surface. The contact point between the rhombus plane 20 and the triangular plane 21 is referred to as a protruding vertex 23. The contact point between the rhombus plane 20 and the triangular plane 21 (protruding vertex 23) is one of vertices of the rhombus of the rhombus plane 20, which is also one of vertices of the triangle of the triangular plane 21.

When viewed on FIG. 5 which is a cross-sectional view, the protruding vertex 23 is provided at one of two positions dividing the decorative area 11 (namely, the area from the inner diameter-side line 12 to the outer diameter-side line 13) equally into three in the tire radial direction. Then, a tangent line with respect to the profile surface drawn from the protruding vertex 23 to the inner side in the tire radial direction corresponds to the line of the triangular plane 21. The tangent line and the profile surface contact each other on the inner diameter-side line 12.

Moreover, a tangent line with respect to the profile surface drawn from the protruding vertex 23 to the outer side in the tire radial direction corresponds to the line of the rhombus plane 20. The tangent line and the profile surface contact each other in the middle between the outer diameter-line 13 and the protruding vertex 23 or the vicinity thereof. Then, a step is formed at a position of the outer diameter-side line 13.

The rhombus plane 20 and the triangular plane 21 are formed so as to be the tangent lines with respect to the profile surface on a cross section in the tire radial direction as described above; therefore, the rhombus plane 20 and the triangular plane 21 correspond to the profile surface at some parts and are placed on a tire outer side from the profile surface at other parts. The protruding vertex 23 protrudes highest from the profile surface in the decorative area 11. A height of the protruding vertex 23 from the profile surface (namely, a height from the profile surface to the protruding vertex 23 in the normal direction of the profile surface) is, for example, 0.5 mm or more to 1.5 mm or less.

The height of the protruding vertex 23 from the profile surface is preferably within a range of 3% or more to 30% or less of a half of a length of the rhombus plane 20 in the tire radial direction. A specific numerical value of the height of the protruding vertex 23 from the profile surface also depends on an outer diameter of the pneumatic tire 1.

Figure 6:
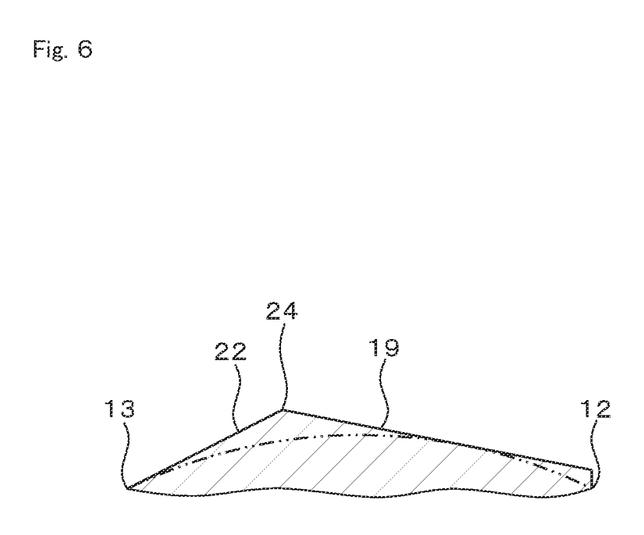
FIG. 6 is B-B cross-sectional view of FIG. 3.

In the same way as the above explanation based on FIG. 5, the rhombus plane 19 and the triangular plane 22 direct different directions (in other words, perpendicular line directions with respect to respective surfaces are different) as shown in FIG. 6. Then, a contact point between the rhombus plane 19 and the triangular plane 22 protrudes high in a normal line direction of the profile surface, which is referred to as a protruding vertex 24.

The protruding vertex 24 is also provided at one of two positions dividing the decorative area 11 (namely, the area from the inner diameter-side line 12 to the outer diameter-side line 13) equally into three in the tire radial direction. Then, a tangent line with respect to the profile surface drawn from the protruding vertex 24 to the inner side in the tire radial direction corresponds to the line of the rhombus plane 19, and a tangent line with respect to the profile surface drawn from the protruding vertex 24 to the outer side in the tire radial direction corresponds to the line of the triangular plane 22.

The rhombus plane 19 and the triangular plane 22 are formed so as to be the tangent lines with respect to the profile surface on a cross section in the tire radial direction as described above; therefore, the rhombus plane 19 and the triangular plane 22 correspond to the profile surface at some parts and are placed on a tire outer side from the profile surface at other parts. The protruding vertex 24 protrudes highest from the profile surface in the decorative area 11. A height of the protruding vertex 24 from the profile surface is the same as the height of the protruding vertex 23 from the profile surface.

Corners at ends in the tire radial direction of the planes are the protruding vertex 23, 24 in any of the rhombus planes 19, 20 and the triangular planes 21, 22. Moreover, as can be seen from FIG. 4, corners at ends in the tire circumferential direction of the rhombus planes 19, 20 are recesses 25 with respect to the protruding vertices 23, 24 of rhombus planes 19, 20 adjacent to each other. As the protruding vertices 23, 24 look bright as the protruding vertices 23, 24 receive much light, whereas the recesses 25 look dark as the recesses 25 do not receive much light.

Figure 7:
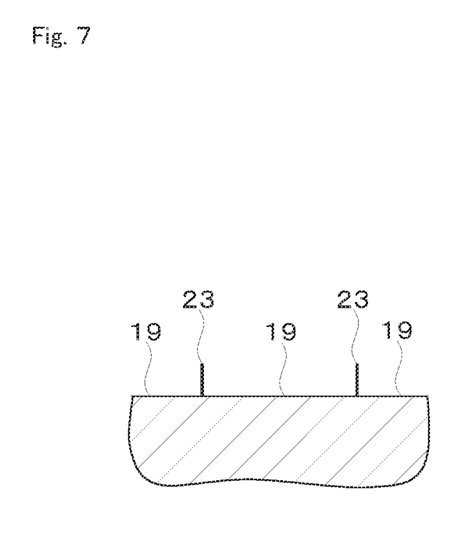
FIG. 7 is C-C cross-sectional view of FIG. 3.
Figure 8:
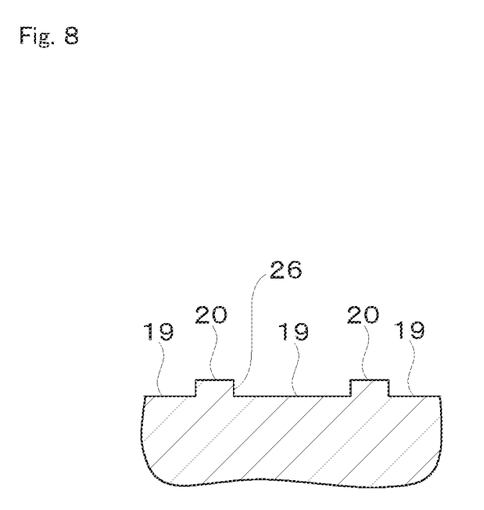
FIG. 8 is D-D cross-sectional view of FIG. 3.
Figure 9:
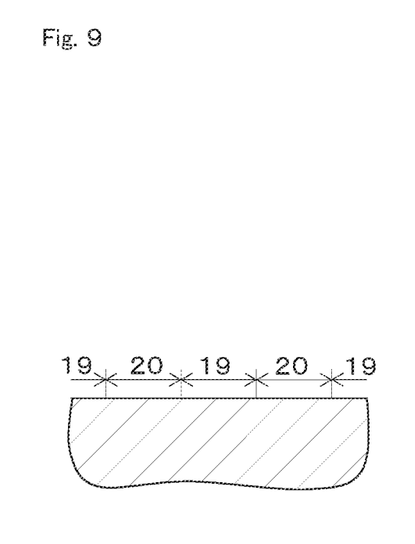
FIG. 9 is E-E cross-sectional view of FIG. 3.
Figure 10:
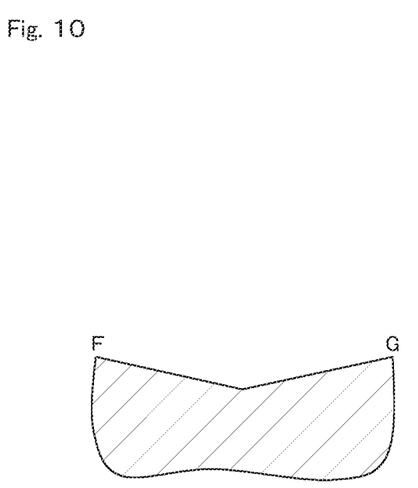
FIG. 10 is a view showing a ridge line from F to G of FIG. 3.

As can be seen from FIG. 4, FIG. 7, FIG. 8, and the like, boundaries between adjacent planes 19, 20, 21, and 22 have steps 26 (see FIG. 4 and FIG. 8). However, there is no step at boundaries between adjacent planes 19, 20, 21, and 22 on reference lines L as can be seen from FIG. 3, FIG. 4, and FIG. 9. Here, the reference lines L are lines extending in the tire circumferential direction through reference positions. The reference positions are positions which are apart in the tire radial direction from the protruding vertices 23, 24 by a distance of ¼ of the length in the tire radial direction of the rhombus planes 19, 20. A cutting line E-E in FIG. 3 corresponds to the reference line L. As shown in FIG. 10, a ridge line between the two protruding vertices 23, 24 is a line bending at a position of the reference line L.

As can be seen from FIG. 4, portions from the reference line L to the protruding vertices 23, 24 are protrusions with an approximately triangular pyramid shape. As protrusions, there are first protrusions 31 having the protruding vertices 23, 24 at inner ends in the tire radial direction of the triangular pyramids and second protrusions 32 having the protruding vertices 23, 24 at outer ends in the tire radial direction of the triangular pyramids.

As can be seen from FIG. 4, and the like the first protrusions 31 and the second protrusions 32 are respectively aligned in a line in the tire circumferential direction. Moreover, the first protrusions 31 and the second protrusions 32 are alternately arranged in the tire radial direction. The protruding vertices 23, 24 of the first protrusion 31 correspond to the protruding vertices 23, 24 of the second protrusion 32.

It is also preferable that a marking or the like is provided on an outer side of the decorative area 11 on the sidewall surface 10, though not shown. The marking or the like is drawn by protrusions/recesses.

The decorative area 11 can be formed by a mold at the time of vulcanization molding of the pneumatic tire 1. Shapes of the rhombus planes 19, 20 and the triangular planes 21, 22 are formed on a molding surface of the mold used at the time of vulcanization molding.

As described above, in the pneumatic tire 1 according to the embodiment, the rhombus planes 19, 20 and planes with a shape of part of a rhombus (triangular planes 21, 22) are tightly arranged in the decorative area 11 so that sides and vertices of the rhombuses correspond to one another and so that two planes 20, 21 (or 19, 22) in which the perpendicular line directions are different are aligned in the tire radial direction. Moreover, the contact points between two planes 20, 21 (or planes 19, 22) aligning in the tire radial direction are the protruding vertices 23, 24 protruding in the normal line direction of the profile surface. Accordingly, new visual effects are created from the pneumatic tire 1.

Specifically, many planes 19, 20, 21, and 22 respectively become light-reflecting surfaces, and the two planes 20, 21 (or 19, 22) reflect light in different directions as the perpendicular directions of the two planes 20, 21 (or 19, 22) aligning in the tire radial direction are different; therefore, a visual effect by light to be generated from a mirror ball is created. Moreover, a visual effect in which the decorative area 11 looks three-dimensional is also created due to creation of irregularities including the protruding vertices 23, 24. Furthermore, since the planes 19, 20 have the rhombus shape, brilliant beauty is generated.

It has been generally known that a streaky recess is generated on the sidewall surface at the time of so-called inflating for giving an internal pressure to the pneumatic tire 1. However, irregularities including the protruding vertices 23, 24 are formed on the sidewall surface 10 according to the embodiment, which makes such streaky recess inconspicuous.

As the protruding vertices 23, 24 protrude to the tire outer side from the profile surface, light easily shines on vicinities of the protruding vertices 23, 24 and the protruding vertices 23, 24 look bright, which gives the decorative area 11 beauty with three-dimensional effect.

Moreover, at least two rows in which a plurality of rhombus planes 19, 20 is aligned in the tire circumferential direction are formed, and the rhombus planes 19 in the first row on the inner side in the tire radial direction and the rhombus planes 20 in the second row on the outer side in the tire radial direction are alternately aligned in the tire circumferential direction; therefore, beauty created by reflection of light on the rhombus planes 19, 20 stands out more.

Since long diagonals of the rhombus planes 19, 20 extend in the tire radial direction, the protruding vertices 23, 24 protrude higher and look brighter as compared with cases where the long diagonals extend in other directions. Accordingly, contrast of bright and dark in the decorative area 11 is increased.

Moreover, the decorative area 11 is the band-shaped area extending around the tire in the tire circumferential direction, and the rhombus planes 19, 20 and the triangular planes 21, 22 are tightly arranged in the entire band-shaped area; therefore, a sense of beauty is generated from the entire sidewall surface 10 in the circumferential direction.

As the rhombus planes 19, 20 and the triangular planes 21, 22 are tightly arranged in the entire decorative area 11 without gaps, beauty like a mirror ball is generated. The beauty like the mirror ball is also caused by providing the rhombus planes 19, 20 and the triangular planes 21, 22 so as to contact the profile surface formed in the curved surface shape.

The above embodiment is merely an example, and a scope of the invention is not limited to the above embodiment. Various modifications may be made with respect to the above embodiment within a scope not departing from the gist of the invention. A plurality of modification examples will be explained below. Any one of the plural modification examples may be applied to the above embodiment as well as two or more examples of the plural modification examples may be combined and applied in a range where contradiction does not arise.

Modification Example 1

The decorative area may be an area with a given shape other than the ring. As given shapes, a marking, a shape of designed letters, a figure, and the like can be cited. A plurality of rhombus planes and the like are tightly arranged in the area having the above shape in the same manner as in the embodiment. Accordingly, the marking and the like look beautiful.

Modification Example 2

The rhombus planes may be arranged so that an extending direction of the long diagonals corresponds to the tire circumferential direction. Also in such case, the ends in the tire radial direction of the rhombus planes will be protruding vertices.

Modification Example 3

Figure 11:
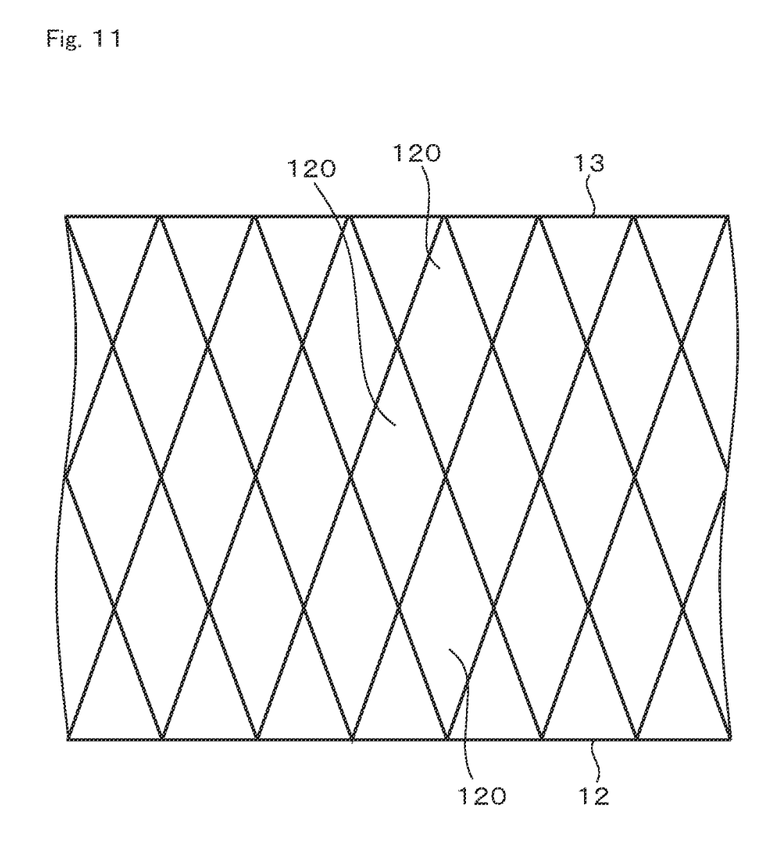
FIG. 11 is an enlarged view of a decorative area on the sidewall surface according to a modification example.

There may be three or more rows of rhombus planes extending around the tire in the tire circumferential direction. For example, three rows of rhombus planes 120 are provided in FIG. 11.

Modification Example 4

In the above embodiment, explanation has been made for the case where vertices of rhombuses of the rhombus planes 19, 20 contact vertices of triangles of the triangular planes 21, 22, and contact points therebetween are the protruding vertices 23, 24. However, it is also preferable that vertices of rhombuses of the rhombus planes 19, 20 are slightly separated from vertices of triangles of the triangular planes 21, 22, and vertices of these rhombuses and triangles respectively become protruding vertices.

In the above case, the vertices of rhombuses of the rhombus planes 19, 20 and the vertices of triangles of the triangular planes 21, 22 to respectively be protruding vertices are the closest contact points of two planes aligning in the tire radial direction.

REFERENCE SIGNS LIST

C: center line
1: pneumatic tire
2: carcass ply
2a: turned-up portion
3: rubber chafer
4: belt
5: belt reinforcing layer
6: tread rubber
7: sidewall rubber
8: rim line
9: bead part
9a: bead core
9b: bead filler
10: sidewall surface
11: decorative area
12: inner-diameter side line
13: outer-diameter side line
19: rhombus plane
20: rhombus plane 21: triangular plane
22: triangular plane
23: protruding vertex
24: protruding vertex
25: recess
26: step
31: first protrusion
32: second protrusion
120: rhombus plane

What is claimed is:

1. A pneumatic tire comprising:
a sidewall surface having a profile surface formed in a curved surface shape; and
a decorative area provided on the sidewall surface, wherein
a plurality of planes with a rhombus shape and a plurality of planes with a shape of part of a rhombus are tightly arranged in the decorative area, the rhombus shape having a long diagonal and a short diagonal,
perpendicular line directions of the planes aligning in a tire radial direction differ,
first opposite vertices of the rhombus shape of each of the planes on the long diagonal of the rhombus shape that is parallel to the tire radial direction are protruding vertices protruding in a normal line direction of the profile surface,
second opposite vertices different from the first opposite vertices of the rhombus shape of each of the planes are recessed vertices relative to the protruding vertices,
a step is formed between each of the recessed vertices of each of the planes and at least one of the protruding vertices of an adjacent one of the planes, and
the planes draw tangent lines with respect to the profile surface on a cross-sectional view in the tire radial direction.

2. The pneumatic tire according to claim 1, wherein
the protruding vertices protrude to a tire outer side from the profile surface.

3. The pneumatic tire according to claim 1, wherein
at least two rows in which rhombus planes that are planes with the rhombus shape are aligned in a tire circumferential direction are formed, and
the rhombus planes in a row on an inner side in the tire radial direction and the rhombus planes in a row on an outer side in the tire radial direction are alternately aligned in the tire circumferential direction.

4. The pneumatic tire according to claim 1, wherein
the decorative area is a band-shaped area extending around the tire in a tire circumferential direction, and
the plurality of planes is tightly arranged in the band-shaped area.

5. The pneumatic tire according to claim 1, wherein
the decorative area is an area with a given shape, and
the plurality of planes is tightly arranged in the area with the given shape.

6. The pneumatic tire according to claim 1, wherein
the decorative area is provided at a place of an end of a tire constituting member in a range from a position of the tire maximum width to a tread end, and
a width of the decorative area is 5 mm or more to 50 mm or less.

7. The pneumatic tire according to claim 1, wherein
a height of the protruding vertices from the profile surface is a length of 3% or more to 30% or less of a half of a length in the tire radial direction of the planes with the rhombus shape.

* * * * *